Figure 1:
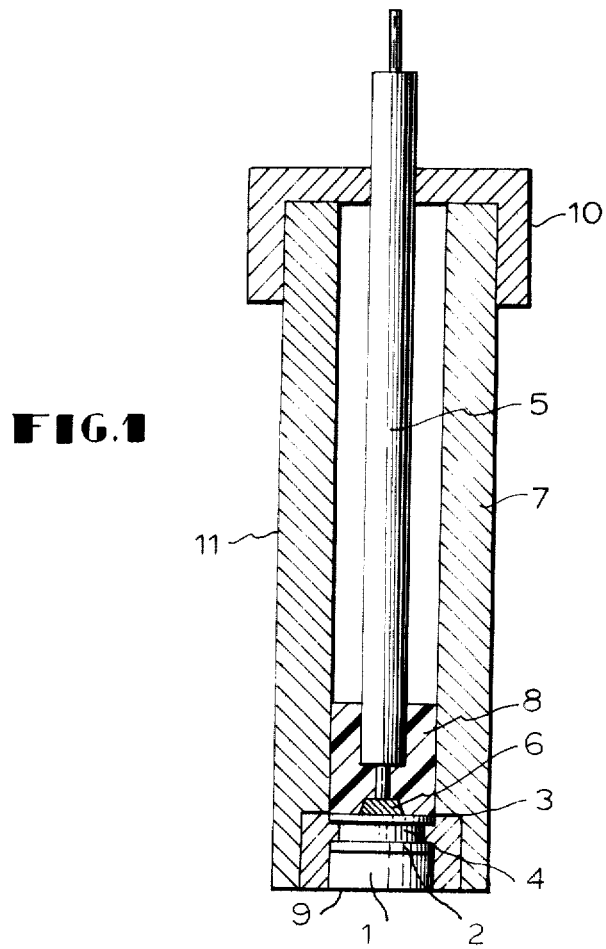

United States Patent [19]

Hattori et al.

[11] 3,892,833
[45] July 1, 1975

[54] METHOD OF MAKING AN ION-SELECTIVE ELECTRODE

[75] Inventors: Masumi Hattori; Teizou Maeda, both of Osaka, Japan

[73] Assignee: Matsushita Electric Industrial Co., Ltd., Japan

[22] Filed: Nov. 8, 1973

[21] Appl. No.: 413,896

[30] Foreign Application Priority Data

| Nov. 10, 1972 | Japan | 47-113350 |
| Nov. 10, 1972 | Japan | 47-113351 |
| June 20, 1973 | Japan | 48-70324 |
| June 20, 1973 | Japan | 48-70325 |

[52] U.S. Cl............ 264/115; 117/100 B; 204/1 T; 204/195; 241/3; 252/79.2; 264/118; 264/134
[51] Int. Cl................................................ B01k 3/10
[58] Field of Search........ 204/195 M; 264/104, 134, 264/118, 115; 117/100 B; 252/79.2; 241/3

[56] References Cited
UNITED STATES PATENTS

| 2,433,353 | 12/1947 | Escoffery et al. | 252/79.2 |
| 2,448,243 | 8/1948 | Anderson | 241/3 |
| 2,902,357 | 9/1959 | Crooks et al. | 241/3 |
| 3,373,113 | 3/1968 | Achenbach | 252/79.2 |
| 3,591,464 | 7/1971 | Frant et al. | 204/195 |
| 3,765,881 | 10/1973 | Scholpp | 241/3 |

OTHER PUBLICATIONS

Mellor—Comprehensive Treatise on Inorg. & Theoretical Chemistry; Vol. 3, p. 469, (1946); Vol. 7, p. 791, (1927), (Longmans–Green), (N.Y.) QD1.AJ1.

Primary Examiner—Melvyn I. Marquis
Assistant Examiner—H. H. Fletcher
Attorney, Agent, or Firm—Wenderoth, Lind & Ponack

[57] ABSTRACT

A method of making an ion-selective membrane of an ion-selective electrode, comprising the steps of coating surfaces of granules of a sulfide compound selected from the group consisting of CdS, PbS and CuS with layer of $Ag_2S$ by chemical reaction in $AgNO_3$ solution, and compressing the resultant granules to form a membrane. The characteristics of the electrode are improved by activating the granules by etching before coating, and further improved by repeating the steps of coating and crushing so as to provide finer granules.

2 Claims, 2 Drawing Figures

METHOD OF MAKING AN ION-SELECTIVE ELECTRODE

This invention relates to a method of making an ion-selective electrode, and more particularly to a method of making an ion-selective electrode for measuring ion activities such as $Cd^{2+}$, $Pb^{2+}$ and $Cu^{2+}$ in solutions.

Recently there have been developed some devices for measuring the ion activities using an ion-selective electrode, for example as disclosed in U.S. Pat. Nos. 3,591,464, 3,669,862 and 3,672,962. Such an ion-selective electrode comprises a solid state electrode membrane. In the conventional art, the solid state electrode membrane is made by a hot-press method or co-precipitation method.

For example, for the ion-selective electrode for measuring the ion activities of $Cd^{2+}$, $Pb^{2+}$, or $Cu^{2+}$, $Ag_2S$ powder is mixed with a sulfide selected from the group of CdS, PbS and CuS, and the mixed powder is compressed to form a tablet under high pressure. Then the pressed tablet is sintered at a high temperature while being pressed, and a solid state electrode membrane is provided. In the case of the latter method using co-precipitation, solutions of $AgNO_3$ and of a salt of nitrate selected from the group of $Cd(NO_3)_2$, $Pb(NO_3)_2$ and $Cu(NO_3)_2$ are mixed in the desired ratio, and the mixed solution is added to a stoichiometric excess of $Na_2S$ solution. Then there is formed precipitated mixture of $Ag_2S$ and a sulfide of CdS, PbS or CuS. The resultant mixed powder is compressed to form a tablet under high pressure, and the solid state membrane is made similarly as the hot-press method described above.

It is required, for these membranes to operate as means for measuring the ion-activities in solution, that the granules of $Ag_2S$ and the sulfide of CdS, PbS or CdS in the membrane react with each other at the boundary thereof. Further, the granules are desired to be as fine as possible for improving the characteristics of the ion-selective electrode. Also, presence of free ion and metal in the membrane should be avoided because it causes degradation of the characteristics of the ion-selective electrode, i.e. decrease of detecting sensitivity and delay of response time. The conventional membrane of the ion-selective electrode is not completely desirable for these requirements.

For example, in the hot-press method, the grain size becomes large because of grain growth by heating, and further hot pressing in air causes oxidation of the tablet by heating which results in deterioration of the characteristics. Even though it may be possible to perform hot pressing in inert gas to prevent the above defect, the apparatus for this is complex and so it is not a productive method. On the other hand, in case of the co-precipitation method, it is difficult to avoid preferential precipitation of $Ag_2S$ because of faster reaction speed of $AgNO_3$ and $Na_2S$ than the reaction speed of, for example, $Pb(NO_3)_2$ and $Na_2S$, and thus provide effective reaction of $Ag_2S$ and PbS.

Therefore, an object of the present invention is to provide a novel and improved method of making an ion-selective electrode membrane which is free from the conventional defects as described above.

A further object of the invention is to provide a method of making an ion-selective electrode having the improved characteristics such as higher detecting sensitivity and fast response time.

A further object of the invention is to provide an improved method of making an ion-selective electrode easily by simple means and with low cost.

These objects are achieved by providing a method of making an ion-selective electrode according to the invention, which is characterized by a process of coating the surface of granules of a sulfide selected from the group consisting of CdS, PbS and CuS with $Ag_2S$ layer by a chemical reaction in $AgNO_3$ solution.

Figure 2:
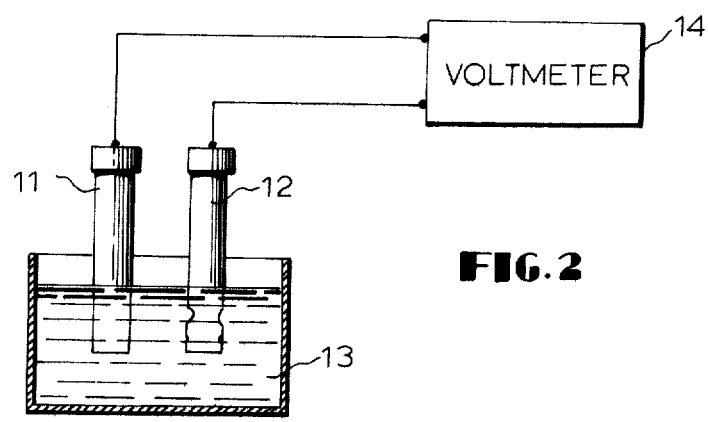

These and other objects and the features of the invention will be apparent upon consideration of the following detailed description taken together with accompanying drawings, in which:

FIG. 1 is a schematic side-elevational, cross-sectional simplified view of an electrode made by the method of the invention; and FIG. 2 is a schematic side-elevational view, of a cell employing the electrode of FIG. 1 for measurement of ion-activities in sample solution.

Referring now to FIG. 1, the ion-selective electrode made by the method of the invention contains a solid state membrane designated by reference numeral 1. One surface of the membrane 1 is coated with a conductive film 2 such as gold, silver, copper or nickel by vacuum deposition method. A metal plate 3, such as copper, is adhered on the conduction film 2 with conductive adhesive 4, and further the usual coaxial cable 5 is soldered to the copper plate 3 by solder 6. A combination of the membrane 1 and the coaxial cable 5 is enclosed in an elongated hollow tubular container 7, which is made by epoxy resin and open at both sides, at the lower open end thereof adhered thereto with epoxy resin 8. An annular cap 10 is fitted with the other open end of the container 7. The cap 10 has an aperture through which the coaxial cable 5 is mounted. The outer surface 9 of the membrane 1, which contacts to sample solution, is polished with alumina powder of nearly $0.05\mu$ in grain size and washed by an ultrasonic cleaner in alcohol solution.

The membrane 1 of the electrode according to the present invention consists of a powder of a sulfide selected from the group consisting of CdS, PbS and CuS according to the desired response of the electrode, the surface of the powder being coated with layer of $Ag_2S$ which is formed in $AgNO_3$ solution. The powder of sulfide is pressed so as to form the membrane 1. Further, the characteristics of the electrode can be improved by etching the powder of sulfide in an etching solution such as $NHO_3$ so as to activate the powder and then by crushing the etched powder into finer granules of the sulfide. Then the layer of $Ag_2S$ is formed on the surfaces of the granules by substitution reaction in the solution of $AgNO_3$, and the resultant granules are pressed to form the membrane 1.

The characteristics of the electrode membrane made by the method of the invention are dependent upon various factors such as the weight percentage ratio of $Ag_2S$ to the sulfide, etching condition of the powder, concentration and temperature of the solutions of $HNO_3$ and $AgNO_3$ and coating time of the layer of $Ag_2S$ in $AgNO_3$ solution. The following are examples of the preparation of the membranes according to the invention, and the response of electrodes using such membranes. Where the response is noted as being Nernstian, it is intended to indicate that the ion-sensitive membrane responds substantially in accordance with well-known Nernst equation in a stable and reproducible manner. The ion-sensitive electrode according to the invention responds stably as being Nernstian to lower ion-activity in sample solution. Further, the method of the invention is superior in the point of reproducibility.

EXAMPLE 1

CdS powders of 10g were prepared by precipitation method, and after being etched for several minutes in a solution of 0.1 mol/liter $HNO_3$, the powders were washed in fresh distilled water. Then, the CdS powders were put into solution of 1 mol/liter $AgNO_3$ which was agitated by a stirrer, and the solution was kept agitated for five minutes so that the surfaces of the CdS powders were coated with an $Ag_2S$ layer according to the following chemical reaction:

$CdS(s) + 2AgNO_3(l) \quad Ag_2S(s) + Cd(NO_3)_2(l)$

The resultant CdS powders coated with an $Ag_2S$ layer were washed in fresh distilled water about twenty times, and after washing they were dried for about one hour at a temperature of 80°C to 100°C in inert gas.

The dried powders were crushed into fine granules by usual crushing means. These steps of coating, washing, drying and crushing were repeated several times. Then, the resultant granules were again etched in 0.1 mol/liter $HNO_3$ solution for about 20 seconds, and after being washed in fresh distilled water, they were dried at a temperature of 80°C to 100°C in inert gas. These final granules contain substantially no free metal and no free metal ions such as Ag and Cd. Then the final granules were pressed, for example under 10 tons/cm² in a die having a diameter of 10 mm, for several minutes at room temperature in air to form a tablet or a membrane. Using the membrane made as described above, the ion-selective electrode as shown in FIG. 1 was constructed.

FIG. 2 shows a schematic diagram of a device for measuring the ion-activities in a solution by using electrode 11 of FIG. 1. The electrode 11 is placed in a sample solution 13 under test so that the outer surface 9 of the membrane 1 contacts the solution 13. A standard reference electrode, such as a saturated calomel electrode, is also placed in contact with the solution 13. The two electrodes 11 and 12 are connected to a voltmeter 14, by which a potential developed by the electrode 11 in the sample solution is measured, together with the reference electrode 12.

The potential Em is developed according to the well-known Nernst equation:

$$Em = Eo + \frac{RT}{nF} \ln C$$

where $Eo$, $R$, $T$ and $F$ are all the usual well-known values, and $C$ is ion-activities of cadmium in the sample solution 13. Usually, the term $RT/nF$ is called as Nernst's constant, and its value is 29.6mV for divalent ion such as $Cd^{2+}$.

According to the method as described hereinbefore, a number of the membranes were made with different coating times of $Ag_2S$ layer. With the ion-selective electrodes using these membranes, ion-activities of cadmium in a number of aqueous solutions of $Cd(NO_3)_2$ having different concentrations diluted precisely and serially were measured, respectively. The measured potentials with these electrodes are shown in the following Table 1 for each $Cd(NO_3)_2$ solution of the different concentrations. The weight percentage ratio of CdS and $Ag_2S$ of each of the membranes of different coating times were as shown in Table 2.

Table 1

| Coating times (N) | Conc. of $Cd^{2+}$ in mol/liter | $10^{-1}$ | $10^{-2}$ | $10^{-3}$ | $10^{-4}$ | $10^{-5}$ | $10^{-6}$ | $10^{-7}$ | $10^{-8}$ |
|---|---|---|---|---|---|---|---|---|---|
| 4 | | 61$^{mV}$ | 31$^{mV}$ | 1$^{mV}$ | −28$^{mV}$ | −58$^{mV}$ | −87$^{mV}$ | −113$^{mV}$ | −129$^{mV}$ |
| 5 | | 56 | 26 | −4 | −33 | −62 | −92 | −120 | −140 |
| 6 | | 54 | 24 | −5 | −35 | −64 | −94 | −121 | −135 |

Table 2

| coating times (N) | weight percentage | |
|---|---|---|
| | CdS | $Ag_2S$ |
| 4 | 34 | 67 |
| 5 | 26 | 74 |
| 6 | 18 | 82 |

EXAMPLE 2

A number of membranes were made by a similar method as described in Example 1, except that powders of PbS prepared by the precipitation method were used instead of the CdS powders, as the powder of sulfide, and that the powders of PbS were put into a solution of 0.2 mol/liter $AgNO_3$ and the solution was agitated by a stirrer for twenty minutes.

Similarly to Example 1, the ion-activities of lead in a number of aqueous solution of $Pb(NO_3)_2$ of different concentrations were measured. Table 2 shows the measured potentials developed by the electrodes containing the membranes made as described above, which consist of the granules of PbS having surfaces coated with $Ag_2S$. The weight percentage ratio of PbS and $Ag_2S$ of each of the membranes were as shown in Table 4.

Table 3

| Coating times (N) | conc. of $Pb^{2+}$ in mol/liter | $10^{-1}$ | $10^{-2}$ | $10^{-3}$ | $10^{-4}$ | $10^{-5}$ | $10^{-6}$ | $10^{-7}$ | $10^{-8}$ |
|---|---|---|---|---|---|---|---|---|---|
| 2 | | 75$^{mV}$ | 45$^{mV}$ | 16$^{mV}$ | −14$^{mV}$ | −43$^{mV}$ | −73$^{mV}$ | −99$^{mV}$ | −113$^{mV}$ |
| 3 | | 67 | 38 | 8 | −21 | −51 | −80 | −108 | −128 |
| 4 | | 66 | 36 | 7 | −23 | −53 | −82 | −109 | −121 |

Table 5

| Coating times (N) | conc. of $Cu^{2+}$ in mol/liter | | | | | | | |
|---|---|---|---|---|---|---|---|---|
| | $10^{-1}$ | $10^{-2}$ | $10^{-3}$ | $10^{-4}$ | $10^{-5}$ | $10^{-6}$ | $10^{-7}$ | $10^{-8}$ |
| 2 | 238 | 209 | 179 | 150 | 120 | 91 | 61 | 36 |
| 3 | 243 | 213 | 183 | 154 | 124 | 94 | 65 | 38 |
| 4 | 235 | 205 | 176 | 146 | 117 | 87 | 57 | 36 |

Table 4

| Coating times (N) | weight percentage | |
|---|---|---|
| | PbS | $Ag_2S$ |
| 2 | 39 | 61 |
| 3 | 24 | 76 |
| 4 | 13 | 87 |

Table 6

| coating times (N) | weight percentage | |
|---|---|---|
| | CuS | $Ag_2S$ |
| 3 | 57 | 43 |
| 4 | 49 | 51 |
| 5 | 42 | 58 |

EXAMPLE 3

A number of membranes were made by a similar method as described in Example 1, except that powders of CuS were used instead of the CdS powders, as the powder of sulfide, and that the powders of CuS were put into solution of 0.7 mol/liter $AgNO_3$ for a first coating time and into 0.2 mol/liter $AgNO_3$ and the solution was agitated by a stirrer for five minutes.

Similarly to Example 1, the ion-activities of copper in a number of aqueous solution of $Cu(NO_3)_2$ of different concentrations were measured. Table 5 shows the measured potentials developed by the electrodes containing the membranes made as described above, which consist of the granules of CuS having surfaces coated with $Ag_2S$. The weight percentage ratio of CuS and $Ag_2S$ of each of the membranes were as shown in Table 6.

What we claim is:

1. A method of making an ion-selective membrane for an ion-selective electrode, comprising the steps of coating the surface of CdS granules with an $Ag_2S$ layer formed by reacting said CdS granules with an $AgNO_3$ solution and compressing the resultant granules to form a membrane, said membrane being responsive to cadmium ions in solution.

2. A method of making an ion-selective membrane for an ion-selective electrode, comprising the steps of coating the surface of CuS granules with an $Ag_2S$ layer formed by reacting said CuS granules with an $AgNO_3$ solution and compressing the resultant granules to form a membrane, said membrane being responsive to copper ions in solution.

* * * * *